United States Patent
Schemmel et al.

(10) Patent No.: US 9,019,658 B1
(45) Date of Patent: Apr. 28, 2015

(54) MAGNETIC HEAD WITH MAGNETIC FIELD CLOSURE FOR MEDIA STORAGE DEVICES

(71) Applicant: Oracle International Corporation, Redwood City, CA (US)

(72) Inventors: Terence Schemmel, Longmont, CO (US); Kevin McKinstry, Westminster, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/295,986

(22) Filed: Jun. 4, 2014

(51) Int. Cl.
*G11B 5/39* (2006.01)

(52) U.S. Cl.
CPC ........................................ *G11B 5/39* (2013.01)

(58) Field of Classification Search
USPC ........................................................ 360/110
See application file for complete search history.

(56) References Cited

U.S. PATENT DOCUMENTS

| | | | |
|---|---|---|---|
| 6,262,869 B1 * | 7/2001 | Lin et al. | 360/324.11 |
| 6,650,512 B1 | 11/2003 | Gill | |
| 6,807,031 B2 | 10/2004 | Macken et al. | |
| 8,797,692 B1 * | 8/2014 | Guo et al. | 360/319 |
| 2003/0147184 A1 * | 8/2003 | Lee et al. | 360/319 |
| 2005/0011066 A1 * | 1/2005 | Gill et al. | 29/603.08 |
| 2005/0013062 A1 * | 1/2005 | Gill | 360/324.12 |
| 2005/0024794 A1 | 2/2005 | Gill | |
| 2005/0264955 A1 * | 12/2005 | Freitag et al. | 360/324.12 |
| 2007/0008762 A1 | 1/2007 | Lin | |

* cited by examiner

*Primary Examiner* — Mark Blouin

(74) *Attorney, Agent, or Firm* — Marsh Fischmann & Breyfogle LLP; Jonathon A. Szumny

(57) ABSTRACT

Systems and methods that serve to limit the generation of stray magnetic fields by moving domain walls of magnetic shields of a magnetic head that would otherwise be received and interpreted as noise at the read sensor of the magnetic head. The utilities disclose use of first and second magnetic "closure" layers (e.g., soft magnetic layers) disposed about but spaced (i.e., magnetically isolated) from the first and second magnetic shields of the read portion of a magnetic head by first and second respective "closure" gaps (e.g., provided by any appropriate non-magnetic, high magnetic permeability material(s)). The closure layers create a magnetic environment for the shield edges that more closely resembles the interior of the shield, thereby minimizing or at least reducing the number of unstable edge domains and limiting subsequent domain wall movement.

20 Claims, 5 Drawing Sheets

MAGNETIC HEAD WITH MAGNETIC FIELD CLOSURE FOR MEDIA STORAGE DEVICES

BACKGROUND

1. Field of the Invention

The present invention generally relates to magnetic heads for tape and disk drives and, more particularly, to magnetic heads that include magnetoresistance (MR) sensors for reading data from storage media.

2. Relevant Background

Computer systems generally utilize auxiliary memory storage devices (e.g., tape drives, disk drives) having media (e.g., magnetic tape, magnetic disks) on which data can be written and from which data can be read for later use. For instance, some storage devices include one or more magnetic heads including read and/or write sensors for performing reading and writing operations on storage media. In the case of a disk drive, one or more magnetic heads are used to read data from and/or write data to concentric, radially spaced tracks on the disk surfaces. In the case of a tape drive, one or more magnetic heads are used to read data from and/or write data to parallel, laterally spaced tracks on the tape surface.

To manufacture such magnetic heads, a multiplicity of magnetic heads are typically simultaneously fabricated by coating a series of layers upon the surface of a wafer that is formed from a head substrate material. The wafer is then separated into individual magnetic heads. The surface formed by one of the separations is polished to form an air-bearing-surface (ABS) or tape-bearing-surface (TBS) of the magnetic head. Each magnetic head includes a write and/or read portion, where the write portion includes at least one write element or sensor and the read portion includes at least one read element or sensor.

MR read sensors (e.g., incorporated on MR heads) are now widespread due to the capability of MR heads to read data at a greater linear density than that of the previously used thin film inductive heads. Generally, an MR sensor detects a magnetic field on the media through a change in resistance in its MR sensing layer (e.g., an "MR element") as a function of the strength and direction of the magnetic flux being sensed by the MR layer. Some MR sensors operate on the basis of the anisotropic MR (AMR) effect in which an MR element resistance varies as the square of the cosine of the angle between the magnetization of the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant MR (GMR) sensor that manifests the GMR effect. In GMR sensors, the resistance of the MR sensing layer(s) varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. In the case of a read portion of a magnetic head, the GMR sensor is sandwiched between first and second nonmagnetic electrically insulating read-gap layers, which are in turn sandwiched between first and second ferromagnetic shield layers. Magnetic flux from the surface of the media (e.g., magnetic disc or tape) causes rotation of the magnetization vector of the MR sensing layer(s), which in turn causes a change in electrical resistivity of the GMR sensor. The change in resistivity of the GMR sensor can be detected by passing a current through the GMR sensor and measuring a voltage across the GMR sensor. External circuitry then converts the voltage information into an appropriate format and manipulates that information as necessary.

A further type of MR sensor is the tunneling MR (TMR) read sensor that includes a nonmagnetic insulating barrier layer sandwiched between a ferromagnetic reference layer and a ferromagnetic sense layer. The thickness of the barrier layer is chosen to be less than the mean free path of conduction electrons passing through the TMR read sensor. The magnetization of the reference layer is pinned in a direction perpendicular to the ABS, while the magnetization of the sense layer is oriented in a direction parallel to the ABS. When passing the sense current through the TMR read sensor, the conduction electrons are scattered at lower and upper interfaces of the barrier layer. When receiving a magnetic field emitting from data in the selected data track, the magnetization of the reference layer remains pinned while that of the sense layer rotates. Scattering decreases as the magnetization of the sense layer rotates towards that of the reference layer, but increases as the magnetization of the sense layer rotates away from that of the reference layer. This scattering variation induces a tunneling effect characterized by a change in the resistance of the TMR read sensor in proportion to the magnitude of the magnetic field and $\cos \theta$, where $\theta$ is an angle between the magnetizations of the reference and sense layers. The change in the resistance of the TMR read sensor is then detected by the sense current and converted into a voltage change that is processed as a read signal.

During a read operation, the first and second shield layers attempt to ensure that read sensor only reads the information stored directly beneath it on a specific track of the magnetic media by absorbing stray magnetic fields emanating from adjacent tracks and transitions. Specifically, a typical shield includes a plurality of magnetic domains (e.g., areas, regions, etc.) separated from each other by a plurality of magnetic domain walls. Each magnetic domain has a magnetization that is oriented in a direction different than that of adjacent domains. The application of an external magnetic field (e.g., from an adjacent track or transition of the magnetic storage medium during operation, during manufacture, etc.) to a shield layer and/or stress due to heating can cause the magnetization of each of the domains within the layer to rotate, thereby causing the domains to move (e.g., shift, flop back and forth, etc.). Because of the random nature of the domain wall locations, the domain walls generally do not return to their original location after the external magnetic field is removed.

SUMMARY

While the shield layers of MR read portions serve to absorb stray magnetic fields emanating from adjacent tracks and transitions, domain wall movement in the shield layers can exert stray magnetic fields on the read sensor (e.g., AMR/GMR/TMR layer(s)) which can be interpreted as noise (e.g., Barkhausen noise) or false signals by the read sensor. One previous arrangement includes use of special shapes for the shields in an attempt to lock in the position of the domain walls and thereby limit the domain walls from having any effect on the read sensor. Another previous arrangement includes an increase in the width of the domain walls or a change in the material from which the shields are made. Another previous arrangement includes placement of a permanent magnet at the sides of the shields in an attempt to "lock down" the domain wall starting points and thereby keep the walls from shifting (e.g., due to the above mentioned triggers). However, all of these previous arrangements suffer from one or more inefficiencies such as increased complexity, increased costs, difficult fabrication techniques, and the like.

In this regard, disclosed herein are systems and methods (e.g., "utilities") for use in reducing noise (e.g., Barkhausen noise) at the read sensor (e.g., sensing layers) of a magnetic head in a manner that is free or largely free of modifications or changes to existing magnetic shields in the read portions of magnetic heads. Broadly, the disclosed utilities include first and second magnetic "closure" layers (e.g., soft magnetic or other highly magnetically permeable layers such as NiFe) that are sandwiched about but spaced (i.e., magnetically isolated) from the first and second magnetic shields of the read portion of a magnetic head by first and second respective "closure" gaps (e.g., each provided by any appropriate non-magnetic material). The closure layers create a magnetic environment for the shield edges that more closely resembles the interior of the shield, thereby minimizing or at least reducing the number of unstable edge domains and limiting subsequent domain wall movement.

In one aspect, a head for reading data from magnetic media includes a bottom magnetically permeable closure layer, a bottom spacer layer positioned above the bottom magnetically permeable closure layer, a bottom shield layer positioned above the bottom spacer layer, a bottom read gap layer positioned above the bottom shield layer, an MR sensor positioned above the bottom read gap layer, a top read gap layer positioned above the MR sensor, a top shield layer positioned above the top read gap layer, a top spacer layer positioned above the top shield layer, and a top magnetically permeable closure layer positioned above the top spacer layer.

In another aspect, a magnetic read head for reading data from a magnetic storage medium includes a read portion and a magnetic field closure portion disposed about the read portion that stabilizes edge domains within bottom and top shield layers of the read portion. For instance, the magnetic field closure portion may include a bottom magnetic field closure portion positioned below the bottom shield and a top magnetic field closure portion positioned above the top shield. In one arrangement, the bottom magnetic field closure portion may include a bottom spacer layer positioned below the bottom shield and a bottom magnetically permeable closure layer positioned below the bottom spacer layer, and the top magnetic field closure portion may include a top spacer layer positioned above the top shield and a top magnetically permeable closure layer positioned above the top spacer layer.

In a further aspect, a method of fabricating a magnetic transducer head for a storage drive includes disposing a first magnetically permeable material upon a substrate, disposing a first non-magnetic material over the first magnetically permeable material, disposing a first shield layer over the first non-magnetic material, disposing a first gap layer over the first shield layer, disposing an MR sensor over the first gap layer, disposing a second gap layer over the MR sensor, disposing a second shield layer over the second gap layer, disposing a second non-magnetic material over the second shield layer, and disposing a second magnetically permeable material over the second non-magnetic material.

For instance, the method may include, after the step of disposing the first shield layer over the first non-magnetic material, removing portions of the first shield layer (e.g., via a photoresist process or the like), where at least one remaining portion of the first shield layer remains after the step of removing portions of the first shield layer. As another example, the method may include, after the step of removing portions of the first shield layer, removing portions of the first non-magnetic material and first magnetically permeable material. In one arrangement, the step of removing portions of the first non-magnetic material and first magnetically permeable material may include using the at least one remaining portion of the first shield layer as a mask over the first non-magnetic material and first magnetically permeable material (e.g., as part of an ion milling process or the like).

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are utilities that serve to limit the movement of domain walls of magnetic shields of a read head that would otherwise be received and interpreted as noise at the read sensor of the read head. The disclosed utilities include use of first and second magnetic "closure" layers (e.g., soft magnetic layers) disposed about but spaced (i.e., magnetically isolated) from the first and second magnetic shields of the read portion of a magnetic head by first and second respective "closure" gaps (e.g., provided by any appropriate non-magnetic material(s)). The closure layers create a magnetic environment for the shield edges that more closely resembles the interior of the shield, thereby minimizing the number of unstable edge domains. The disclosed utilities can advantageously improve the data retrieval accuracy of the read portions of read heads.

Figure 1:
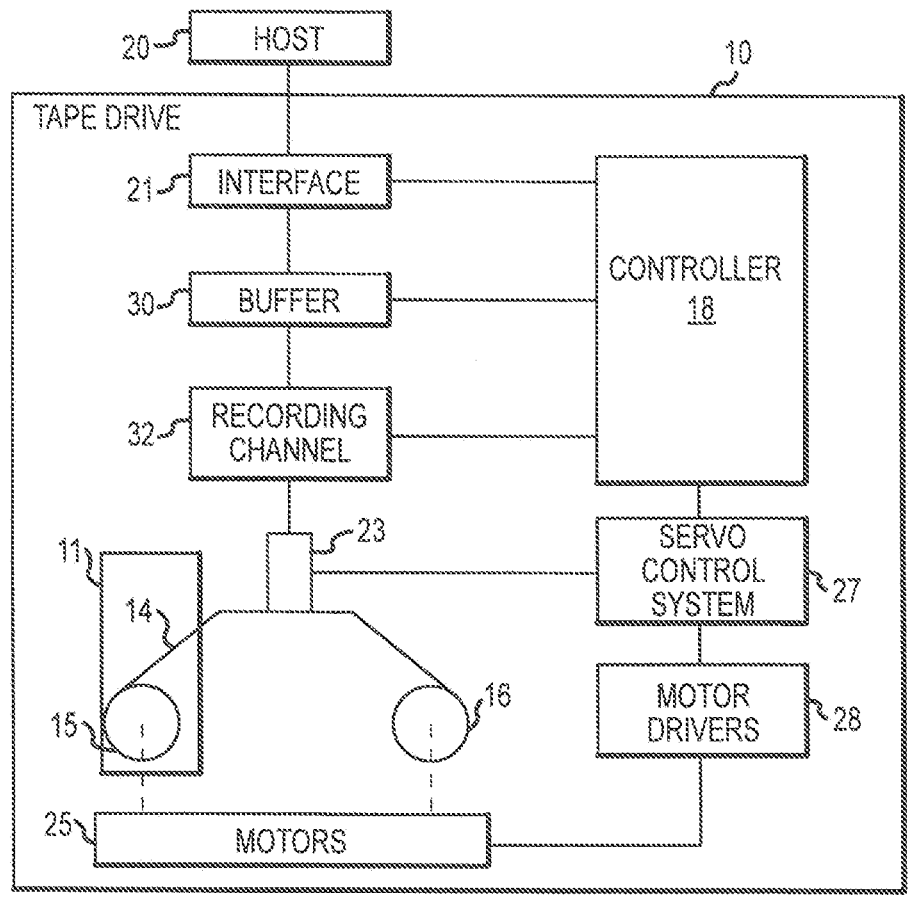
FIG. 1 is a schematic diagram of a tape drive that may incorporate a magnetic head for reading data from recording media as disclosed herein.

Before discussing the disclosed magnetic heads herein in more detail, it may be useful to disclose a couple of representative environments into which the disclosed magnetic heads may be incorporated (while it is to be understood, however, that numerous other such contexts are envisioned and encompassed herein). In this regard, FIG. 1 presents a schematic view of an exemplary tape drive 10 within which the disclosed magnetic head may be implemented to read data from magnetic tape media. For instance, the tape drive 10 may receive a magnetic tape cartridge 11 that includes a length of magnetic tape 14 (e.g., magnetic tape pack, magnetic tape media) wound on at least one reel 15. One or more controllers 18 of a recording system may be included for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that at least one magnetic head of a head positioning assembly (HPA) 23 of the recording system reads and/or writes information with respect to the magnetic tape 14 as the tape 14 is moved longitudinally in first/forward and/or second/reverse opposed directions by one or more motors 25 past a TBS of the HPA 23. For instance, the HPA 23 may include one or more heads, where each head includes a series of servo, read, and/or write elements (e.g., transducers). The recording system may include a servo control or tracking system 27 to electronically switch from one heads to another heads, to seek and move the heads laterally relative to the tape 14, to position the heads at a desired location over the tape 14 and/or one or more tracks of the tape 14, to follow one or more desired tracks, and/or the like. The various components of the tape drive 10 may be incorporated or otherwise embodied within any appropriate housing (not shown). The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2:
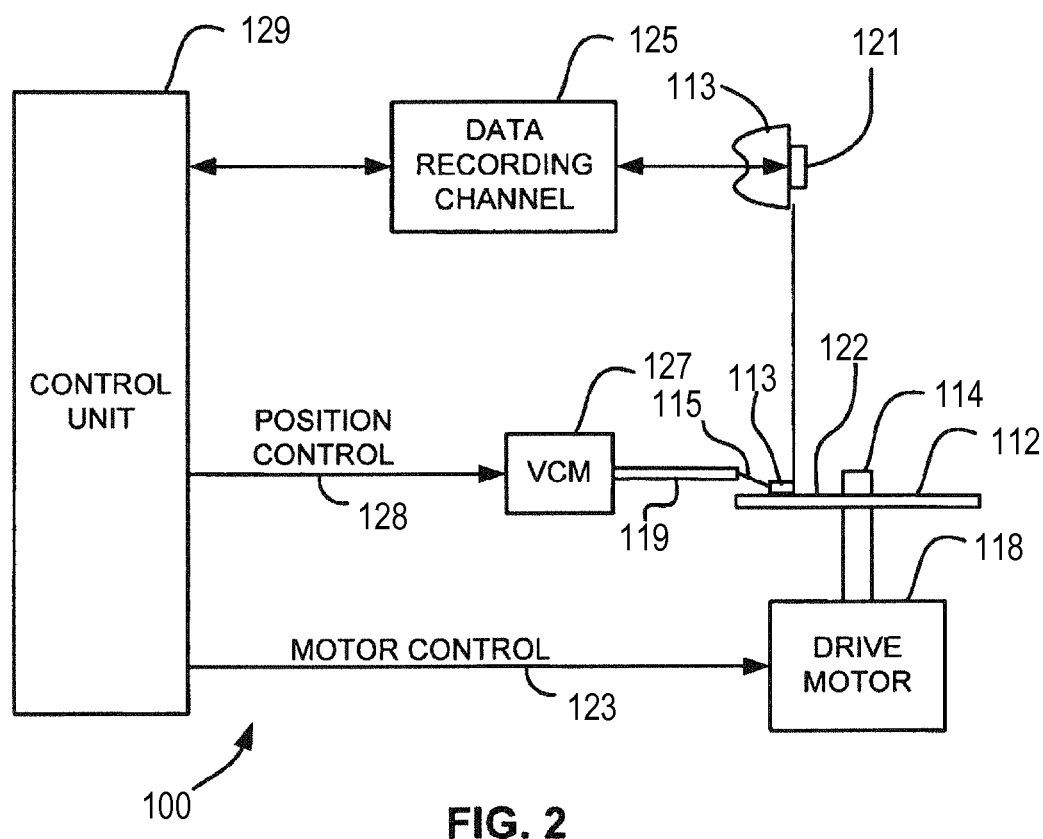
FIG. 2 is a schematic diagram of a disk drive that may incorporate a magnetic head for reading data from recording media as disclosed herein.

FIG. 2 presents a schematic diagram of a disk drive 100 within which the disclosed magnetic head may be implemented to read data from magnetic tape media. The disk drive 100 includes at least one rotatable magnetic disk 112 supported on a spindle 114 and rotated by a disk drive motor 118. The magnetic recording media on each magnetic disk 112 is in the form of concentric, annular data tracks (not shown). At least one slider 113 is positioned on the disk 112, each of which supports one or more magnetic read/write heads 121. As each magnetic disk 112 rotates, the slider 113 is moved radially in and out over the disk surface 122 so that the heads 121 may access different portions of the magnetic disk 112 where desired data is recorded. Each slider 113 is attached to an actuator arm 119 by means of a suspension 115 that provides a slight spring force which biases the slider 113 against the disk surface 122. Each actuator arm 119 is attached to an actuator structure 127 that may be a voice coil motor (VCM) movable within a fixed magnetic field. The direction and speed of the coil movements are controlled by the motor current signals supplied by a controller 129.

During operation of the disk storage system, rotation of each magnetic disk 112 generates an air bearing between the slider 113 (e.g., the surface of the slider 113, which includes head 121 and faces the surface of disk 112, is referred to as an ABS) and the disk surface 122 which exerts an upward force or lift on the slider 113. The air bearing thus counter-balances the slight spring force of the suspension 115 and supports the slider 113 off and slightly above the disk surface by a small, substantially constant spacing during normal operation. The various components of the disk drive 100 are controlled in operation by control signals generated by a control unit 129, where the control signals include access control signals and internal clock signals. Typically, the control unit 129 comprises logic control circuits, storage and a microprocessor. The control unit 129 generates control signals to control various system operations such as drive motor control signals on a line 123 and head position and seek control signals on a line 128. The control signals on the line 128 provide the desired current profiles to optimally move and position the slider 113 to the desired data track on the disk 112. Read and write signals are communicated to and from the read/write heads 121 by means of a recording channel 125.

Figure 3:
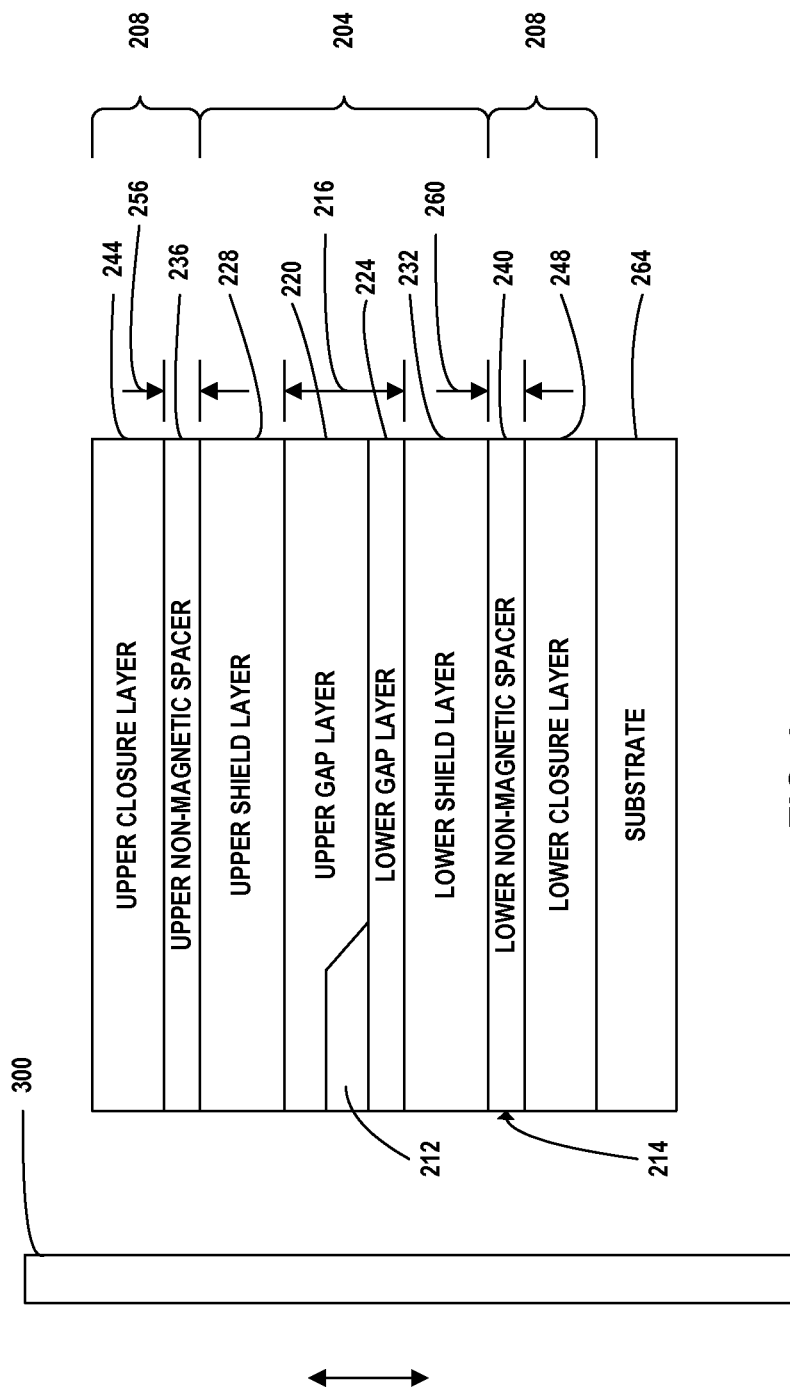
FIG. 3 is cross-sectional view of a read portion of a magnetic head according to an embodiment.
Figure 4:
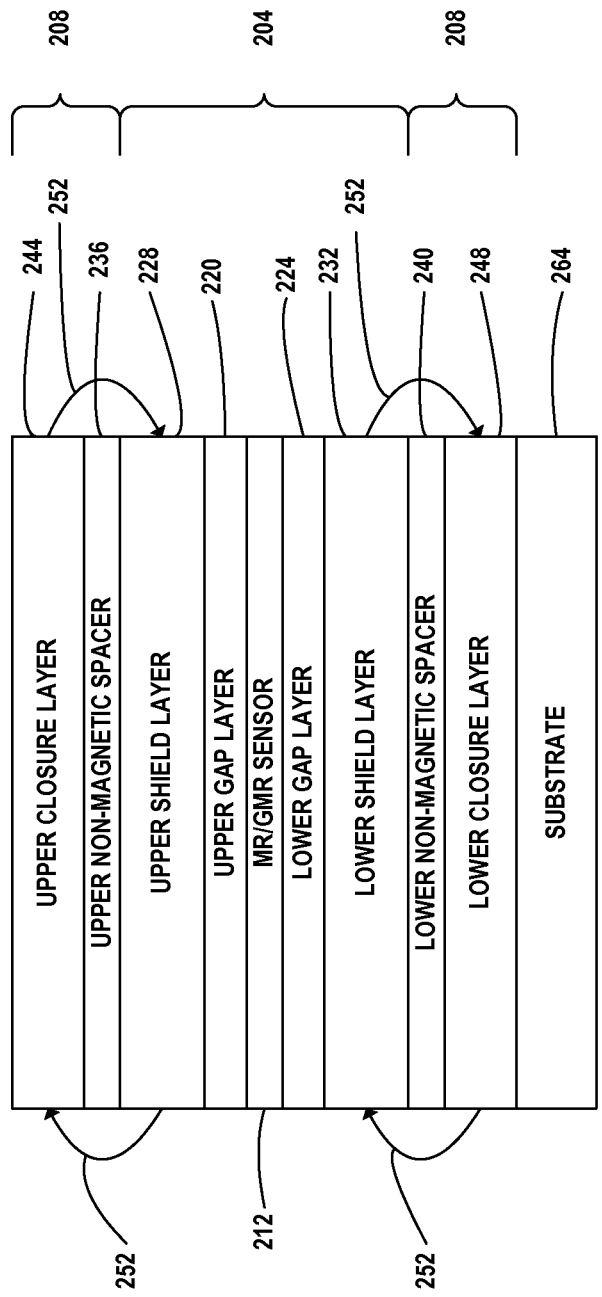
FIG. 4 is an air bearing surface (ABS) view of the read portion of the magnetic head of FIG. 3.

As discussed previously, the domain walls of the magnetic shields of the read portions of magnetic heads can shift during reading operations (e.g., due to the application of an external magnetic field from media). The shifting domain walls generate stray magnetic fields that can be interpreted as noise at the read sensing layer(s) which inhibits reading operations. In this regard, FIGS. 3-4 illustrates a portion of a magnetic head 200 that serves to limit the aforementioned generation of stray magnetic fields that would otherwise be interpreted as noise at the read sensing layer(s) of a read portion of a read head (e.g., part of HPA 23 of FIG. 1, read/write head 121 of FIG. 2).

Broadly, the magnetic head 200 includes a read portion 204 that may be appropriately controlled (e.g., by the controller 18 of FIG. 1 or control unit 129 of FIG. 2) to read magnetically encoded data from a magnetic storage media 300 (e.g., magnetic tape, magnetic disk, etc.). The magnetic head 200 also includes a magnetic field closure portion 208 disposed about the read portion 204 that serves to create a magnetic environment for the shield edges that more closely resembles the interior of the shields, thereby minimizing the number of unstable edge domains. While the read portion 204 and magnetic field closure portion 208 have been identified by separate reference numerals in FIG. 3 for purposes of facilitating the reader's understanding of the disclosed magnetic head 200, it is to be understood that the magnetic field closure portion 208 may in actuality be considered part of the read portion 204.

At the heart of the read portion 204 may be an MR sensor 212 (e.g., AMR sensor, GMR sensor, TMR sensor) made up of one or more layers for use in reading data encoded on the magnetic storage media 300 as the magnetic storage media moves past an ABS (or TBS) 214 of the magnetic head 200. As discussed previously, the MR sensor 212 detects magnetic fields on the magnetic storage media 300 through changes in resistance in one or more sensing layer (e.g., sensing elements) in the MR sensor 212 as a function of the strength and direction of the magnetic flux being emitted by the magnetic storage media 300. For instance, a GMR sensor 212 includes a plurality of alternating magnetic and non-magnetic layers, where the resistance of the sensing layer(s) varies as a function of the spin-dependent transmission of the conduction electrons between the magnetic layers.

The MR sensor 212 may be disposed within a read gap 216 formed by upper and lower gap layers 220, 224 (e.g., any appropriate non-magnetic material, such as $Al_2O_3$), where the upper and lower gap layers 220, 224 are disposed (e.g., sandwiched) about opposing sides of the MR sensor 212. Upper and lower magnetic shield layers 228, 232 (e.g., NiFe or the like) are respectively disposed (e.g., sandwiched) about the upper and lower gap layers 220, 224 and serve to absorb stray magnetic fields generated by the magnetic storage media 300 and attempt to ensure that only desired portions of the magnetic storage media 300 are read by the MR sensor 212. However, domain wall movement within the upper and lower shield layers 228, 232 may, in the absence of the magnetic field closure portion 208, create magnetic fields and flux paths that may be received at the MR sensor 212 and interpreted as noise.

In this regard, the magnetic field closure portion 208 includes upper and lower non-magnetic spacers 236, 240 (e.g., "closure gaps" or "closure gap layers", such as $Al_2O_3$ or the like) respectively disposed (e.g., sandwiched) about the upper and lower shield layers 228, 232 as well as upper and lower magnetically permeable closure layers 244, 248 (e.g., NiFe or the like) disposed about the upper and lower non-magnetic spacers 236, 240. The upper and lower non-magnetic spacers 236, 240 respectively magnetically isolate the upper and lower closure layers 244, 248 from the upper and lower shield layers 228, 232 so that magnetic flux paths 252 (see FIG. 4) within the upper and lower shield layers 228, 232 respectively pass into the upper and lower closure layers 244, 248 before returning to the upper and lower shield layers 228, 232, thereby stabilizing edge domains in the upper and lower shield layers 228, 232. As just one example, the relative magnetic permeability of each of the upper and lower closure layers 244, 248 may be at least about 500. As another example, the relative magnetic permeability of each of the upper and lower non-magnetic spacers 236, 240 may be no more than about 10.

In one arrangement, each of respective upper and lower closure gaps 256, 260 provided by the upper and lower non-magnetic spacers 236, 240 may be less than the read gap 216 (i.e., a thickness of each the upper and lower non-magnetic spacers 236, 240 may be less than a width of the read gap 216) because magnetic coupling between layers increases inversely with separation. For instance, each of the upper and lower closure gaps 256, 260 may be at least about 300 angstroms (Å). As another example, each of the upper and lower closure gaps 256, 260 may be no greater than about 1000 Å. In contrast, the read gap 216 may be at least about 1500 Å. For instance, a ratio each of the upper and lower closure gaps 256, 260 to read gap 216 may be no greater than about 0.5. In one arrangement, a thickness of each of the upper and lower closure layers 244, 248 may be at least about 250 Å. For instance, a ratio of the thickness of each of the upper and lower closures layers 244, 248 to each of the upper and lower non-magnetic spacers 236, 240 may be at least about ¼.

Figure 5:
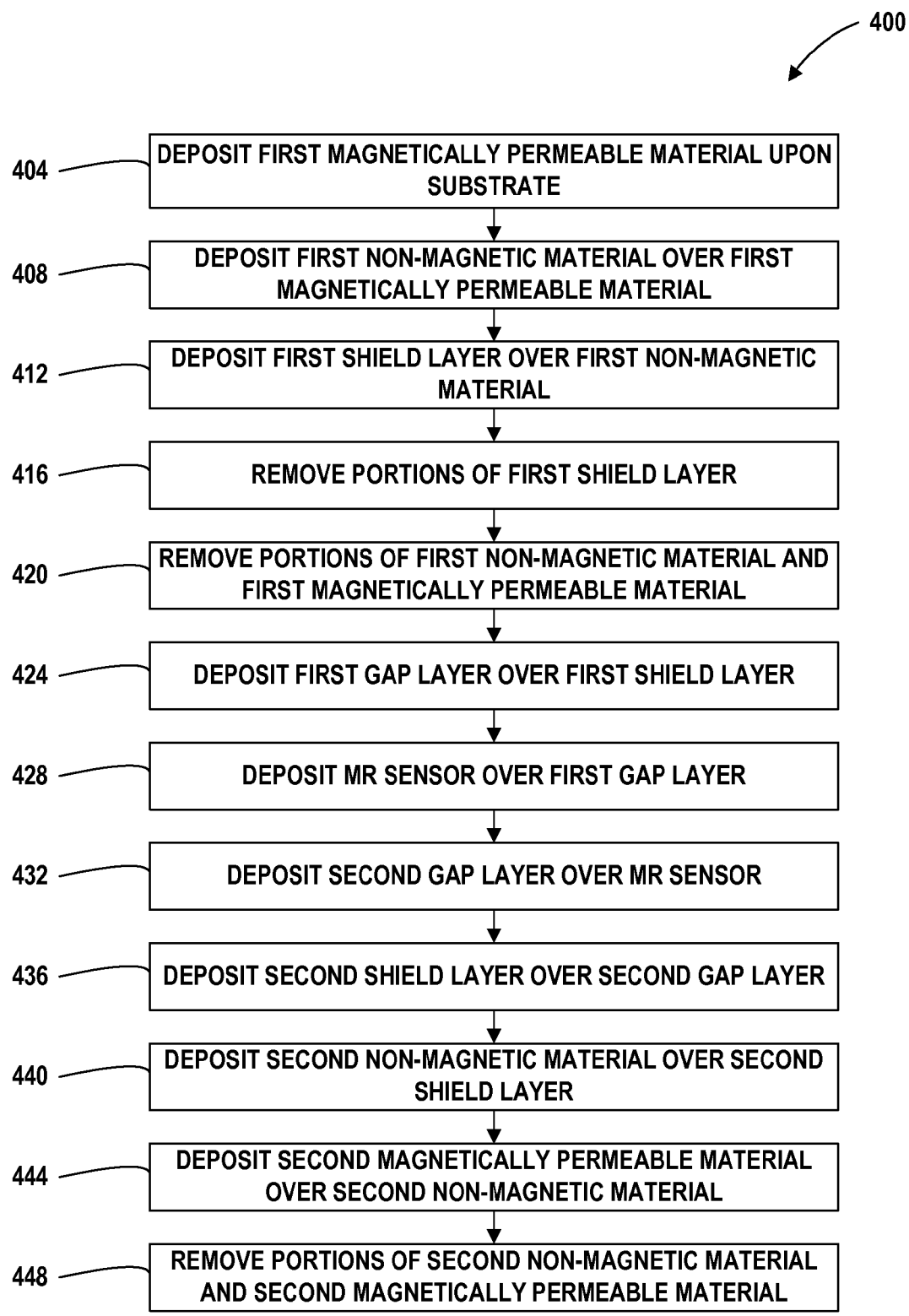
FIG. 5 is a flow diagram of a method of fabricating a read portion of a magnetic head according to an embodiment.

With additional reference now to FIG. 5, one method 400 of fabricating one or more magnetic heads 200 will now be discussed although it is to be understood that other methods may also be used to fabricate the magnetic head 200. Initially, a first magnetically permeable material (e.g., lower closure layer 248) may be deposited 404 or otherwise disposed (e.g., via vacuum deposition) on top of a wafer or substrate (e.g., substrate 264 such as glass, semiconductor material, conductive $Al_2O_3$/TiC, etc.) to form a seedlayer upon which subsequent layers may be grown or otherwise formed. A first non-magnetic material (e.g., lower non-magnetic spacer 240) may then be appropriately deposited 408 over or on (e.g., in direct contact with) the first magnetically permeable material and then a first shield layer (e.g., lower shield layer 232) may be deposited 412 over or on (e.g., in direct contact with) the first non-magnetic material. In one embodiment, an underlayer (e.g., $Al_2O_3$) of any appropriate thickness (e.g., in one non-limiting example, at least about 3 μm) may be disposed (e.g., deposited) over (e.g., in direct contact with) the substrate 264 before the depositing 404 of the first magnetically permeable material.

In any case, the method 400 may then include removing 416 portions of the first shield layer and removing portions 420 of the first non-magnetic material and first magnetically permeable material. For instance, the removing 416 may include defining the first shield layer using any appropriate photoresist process (e.g., disposing a mask over appropriate portions of the first shield layer and then applying an appropriate light source), where at least one portion of the first shield layer remains after the removing 416. Thereafter, the remaining portion of the first shield layer may be used during the step of removing 420 portions of the first non-magnetic material and first magnetically permeable material. For instance, the remaining portion of the first shield layer may be used as a mask and then the first non-magnetic material and first magnetically permeable material may be subjected to any appropriate ion milling process.

The method 400 may continue with depositing 424 a first gap layer (e.g., lower gap layer 224) over (e.g., in direct contact with) the first shield layer (e.g., the remaining portion of the first shield layer), depositing 428 an MR sensor (e.g., MR sensor 212, which may include multiple layer depositing steps) over the first gap layer, depositing 432 a second gap layer (e.g., upper gap layer 220) over the MR sensor, and depositing 436 a second shield layer (e.g., upper shield layer 228) over (e.g., in direct contact with) the second gap layer. In one arrangement, the second shield layer may be appropriately defined by any appropriate photoresist process (e.g., after the depositing 436). A second non-magnetic material (e.g., upper non-magnetic spacer 236) may then be deposited 440 over (e.g., in direct contact with) the second shield layer and a second magnetically permeable material (e.g., upper closure layer 244) may be deposited 444 over (e.g., in direct contact with) the second non-magnetic material. In the event the second shield layer is not defined after the depositing 436, the second shield layer may be defined after the second magnetically permeable material is in place.

The method 400 may then include removing 448 portions of the second non-magnetic material and second magnetically permeable material. For instance, portions of the non-magnetic material and second magnetically permeable material may be defined using a photomask process on the second shield layer. Any unwanted material may be removed (e.g., milled, etched, etc.) from the unmasked portion of the resulting wafer and then any appropriate additional processing steps may be performed. For instance, the wafer may be appropriately sliced to create a plurality of magnetic heads 200, each magnetic head 200 may be polished to form an ABS or TBS, etc.

It is to be understood that the figures presented herein have not necessarily been drawn to scale unless otherwise specified. Furthermore, many components or features of the magnetic head 200 have been left out of this discussion in the interest of clarity or brevity. For instance, the ABS view of FIG. 4 may represent a "read region" of the magnetic head 200, where first and second opposite "side regions" may be defined on opposite sides of the read region and including side stacks made up of bias layers, electrical lead layers, and/or the like. Furthermore, it will be readily appreciated that many additions and/or deviations may be made from the specific embodiments disclosed in the specification without departing from the spirit and scope of the invention. In one arrangement, the magnetic head 200 may additionally include a write portion (e.g., disposed above or below the read portion 204 and magnetic field closure portion 208) configured to write or otherwise magnetically encode data to a magnetic storage media (e.g., magnetic storage media 300). For instance, the write portion may include top and bottom poles that define a write gap therebetween (e.g., where the write gap may be filled with any appropriate insulator such as alumina). A plurality of coils embedded in one or more insulation layers may be provided between the top and bottom poles. The coils may be energized and the top and bottom poles controlled to write data on the magnetic storage media via the write gap by appropriately changing the status of data bits on the magnetic storage media.

Embodiments disclosed herein can be implemented as one or more computer program products, i.e., one or more modules of computer program instructions encoded on a computer-readable medium for execution by, or to control the operation of, data processing apparatus. For example, the logic or software of the controller 18/control unit 129 may be provided in such computer-readable medium of the tape drive 10/disk drive 100 (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the tape drive 10/disk drive 100 may encompass or be in communication with one or more apparatuses, devices, and machines for processing data, including by way of example a programmable processor, a computer, or multiple processors or computers. In addition to hardware, the tape drive 10/disk drive 100 may include or be associated with code that creates an execution environment for the computer program in question, e.g., code that constitutes processor firmware, a protocol stack, a database management system, an operating system, or a combination of one or more of them.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A head for reading data from magnetic media, comprising:
   a bottom magnetically permeable closure layer;
   a bottom spacer layer positioned above the bottom magnetically permeable closure layer;
   a bottom shield layer positioned above the bottom spacer layer;
   a bottom read gap layer positioned above the bottom shield layer, wherein the bottom shield layer is disposed between the bottom spacer layer and the bottom read gap layer;
   a magnetoresistive (MR) sensor positioned above the bottom read gap layer;
   a top read gap layer positioned above the MR sensor;
   a top shield layer positioned above the top read gap layer;
   a top spacer layer positioned above the top shield layer; and
   a top magnetically permeable closure layer positioned above the top spacer layer.

2. The head of claim 1, wherein each of the bottom and top spacer layers comprises a non-magnetic material.

3. The head of claim 2, wherein each of the bottom and top spacer layers includes a thickness of not greater than about 1000 angstroms.

4. The head of claim 2, wherein a relative magnetic permeability of each of the bottom and top spacer layers is not greater than about 10.

5. The head of claim 1, wherein the bottom and top read gap layers define a read gap, and wherein a thickness of each of the bottom and top spacer layers is less than the read gap.

6. The head of claim 1, wherein the relative magnetic permeability of each of the bottom and top magnetically permeable closure layers is at least about 500.

7. A data storage drive, comprising:
   the head of claim 1.

8. A system, comprising:
   the data storage drive of claim 7; and
   a magnetic storage medium.

9. The system of claim 8, wherein the magnetic storage medium comprises at least one magnetic disk or at least one magnetic tape.

10. A magnetic head for use with a magnetic storage medium, comprising:
    a read portion, including:
       a bottom shield layer;
       a bottom read gap layer positioned above the bottom shield layer;
       a magnetoresistive (MR) sensor positioned above the bottom read gap layer;
       a top read gap layer positioned above the MR sensor; and
       a top shield layer positioned above the top read gap layer; and
    a magnetic field closure portion disposed above and below the read portion, wherein the magnetic field closure portion limits movement of walls between magnetic domains of the bottom and top shield layers of the read portion by receiving magnetic flux paths from the bottom and top shield layers.

11. The magnetic head of claim 10, wherein the magnetic field closure portion includes:
    a bottom magnetic field closure portion positioned below the bottom shield; and
    a top magnetic field closure portion positioned above the top shield.

12. The magnetic head of claim 11, wherein the bottom magnetic field closure portion includes a bottom spacer layer positioned below the bottom shield and a bottom magnetically permeable closure layer positioned below the bottom spacer layer, and wherein the top magnetic field closure portion includes a top spacer layer positioned above the top shield and a top magnetically permeable closure layer positioned above the top spacer layer.

13. The magnetic head of claim 12, wherein each of the bottom and top spacer layers comprises a non-magnetic layer.

14. The magnetic head of claim 10, further including a write portion.

15. A method of fabricating a magnetic transducer head for a storage drive, comprising:
    disposing a first magnetically permeable material upon a substrate;
    disposing a first non-magnetic material over the first magnetically permeable material;
    disposing a first shield layer over the first non-magnetic material;
    disposing a first gap layer over the first shield layer so that the first shield layer is disposed between the first non-magnetic material and the first gap layer;
    disposing a magnetoresistive (MR) sensor over the first gap layer;
    disposing a second gap layer over the MR sensor;
    disposing a second shield layer over the second gap layer;
    disposing a second non-magnetic material over the second shield layer; and
    disposing a second magnetically permeable material over the second non-magnetic material.

16. The method of claim 15, further including after the step of disposing the first shield layer over the first non-magnetic material:
    removing portions of the first shield layer, wherein at least one remaining portion of the first shield layer remains after the step of removing portions of the first shield layer.

17. The method of claim 16, wherein the step of removing portions of the first shield layer includes performing a photoresist process on the first shield layer.

18. The method of claim 16, further including after the step of removing portions of the first shield layer:
    removing portions of the first non-magnetic material and first magnetically permeable material.

19. The method of claim 18, wherein the step of removing portions of the first non-magnetic material and first magnetically permeable material includes:
    using the at least one remaining portion of the first shield layer as a mask over the first non-magnetic material and first magnetically permeable material.

20. The method of claim 19, wherein the step of removing portions of the first non-magnetic material and first magnetically permeable material includes ion milling the first non-magnetic material and first magnetically permeable material.

* * * * *

UNITED STATES PATENT AND TRADEMARK OFFICE
CERTIFICATE OF CORRECTION

| | | |
|---|---|---|
| PATENT NO. | : 9,019,658 B1 | Page 1 of 1 |
| APPLICATION NO. | : 14/295986 | |
| DATED | : April 28, 2015 | |
| INVENTOR(S) | : Schemmel et al. | |

It is certified that error appears in the above-identified patent and that said Letters Patent is hereby corrected as shown below:

In the specification,

In column 1, line 62, delete "nonmagnetic" and insert -- non-magnetic --, therefor.

In column 2, line 8, delete "nonmagnetic" and insert -- non-magnetic --, therefor.

Signed and Sealed this
Ninth Day of February, 2016

Michelle K. Lee
*Director of the United States Patent and Trademark Office*